Aug. 30, 1966 J. A. RUSSELL 3,269,259
PROJECTION APPARATUS FOR PROJECTING BOWLING SCORES
Filed May 8, 1964 2 Sheets-Sheet 1
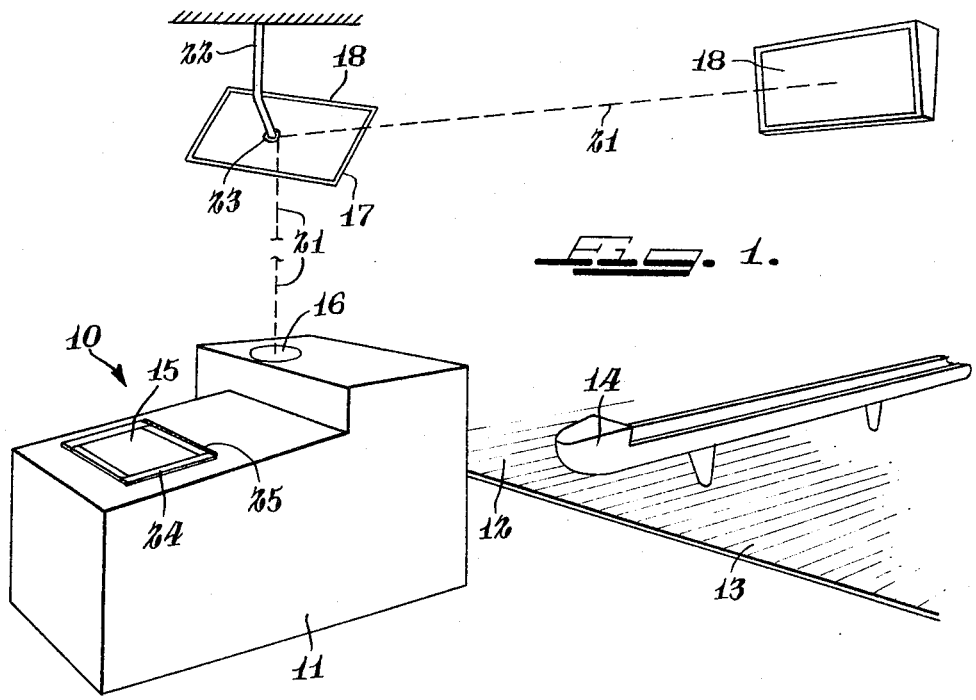
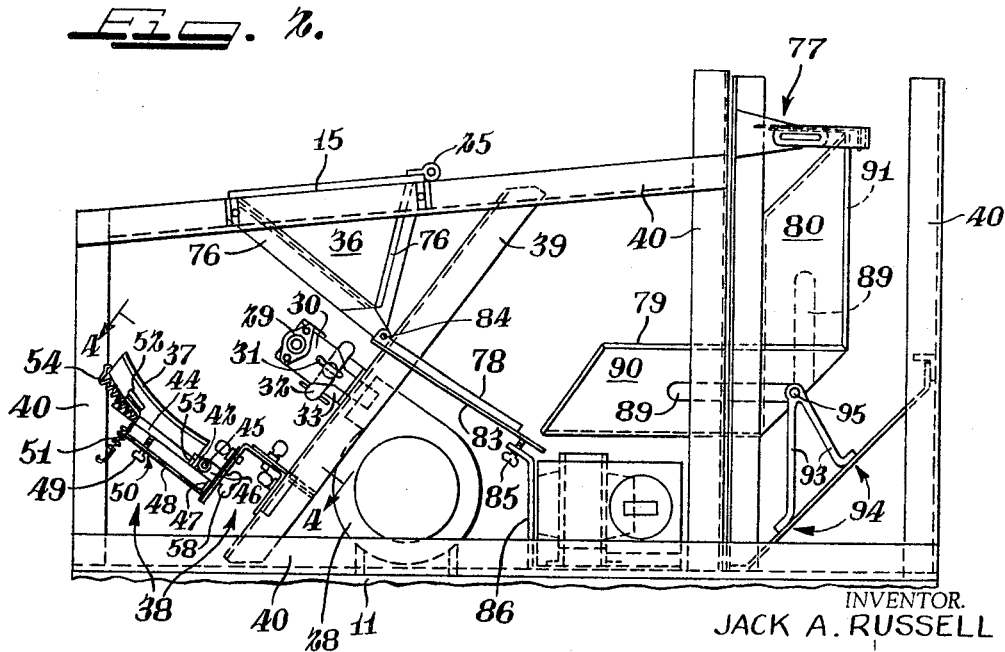
INVENTOR.
JACK A. RUSSELL
BY Hofgren, Wegner,
Allen, Stellman & McCord
Attys.

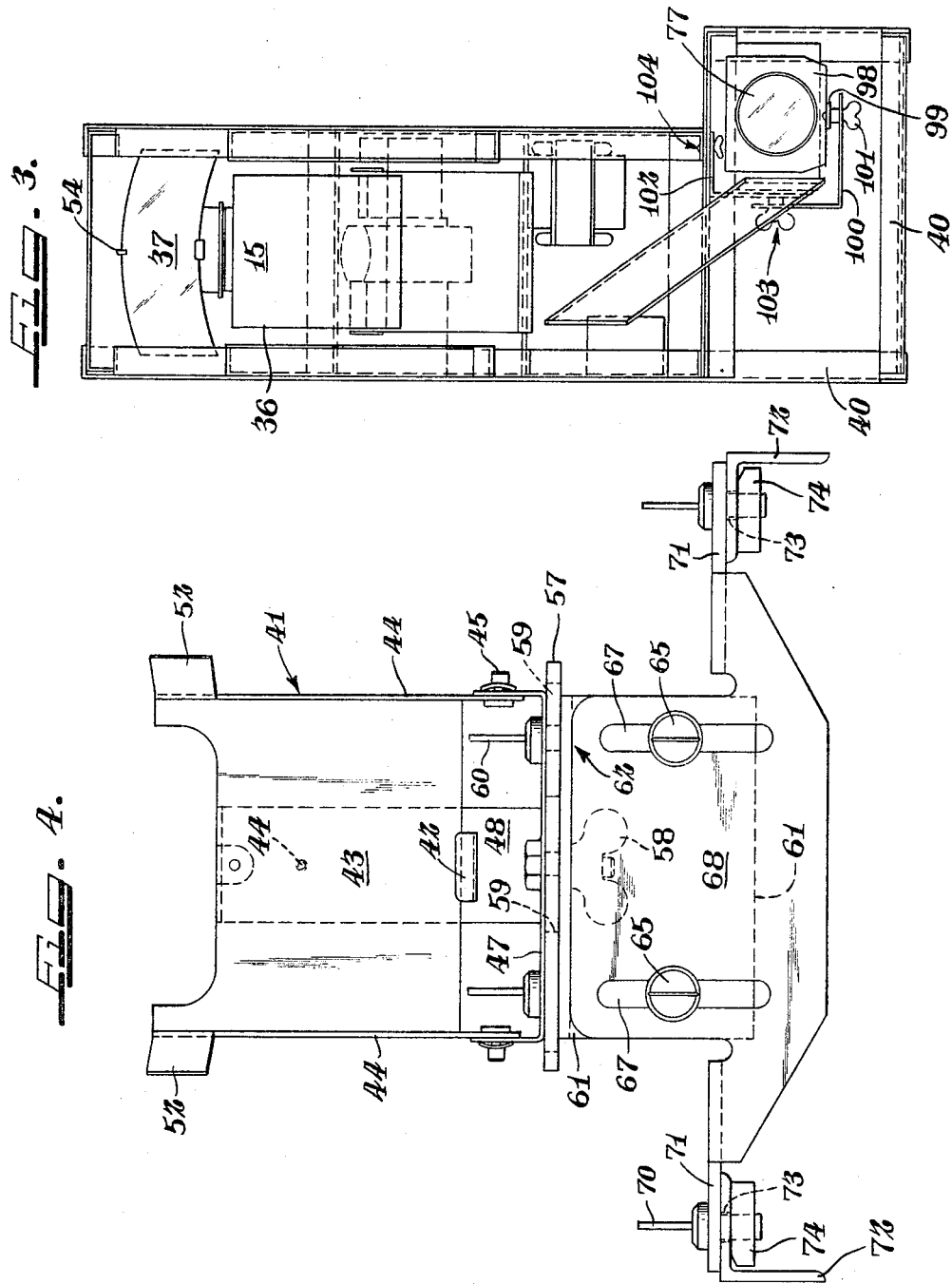

United States Patent Office 3,269,259
Patented August 30, 1966

3,269,259
PROJECTION APPARATUS FOR PROJECTING
BOWLING SCORES
Jack A. Russell, Muskegon, Mich., assignor to Brunswick
Corporation, a corporation of Delaware
Filed May 8, 1964, Ser. No. 365,960
14 Claims. (Cl. 88—24)

This invention relates to projection or viewing apparatus and more particularly relates to a projecting device for projecting bowling scores to a viewing screen.

Recently, attention has been directed to development of devices capable of producing printed bowling score information and projecting such information to a viewing screen to which reference may be made by bowlers and spectators during a bowling game for obtaining a given bowler's status with respect to score at any time during the game.

Not only have the more usual projection devices been further developed in an attempt to adapt such devices for bowling purposes, but additional devices have been developed specifically for the need of bowling score projection. Of the latter type of devices, for example, a particularly advantageous projection system has been proposed employing an internally reflective surface, such as a prism, as an image source for projection. Such a device has been described by Roop in application Serial No. 288,719, filed June 18, 1963, and assigned to the assignee of this application. The prism projection device has the advantage of permitting continuous projection of an image onto a viewing screen while altering or adding to the image in a manner concealed from the viewer.

During a bowling game, it is important to obtain a projection of the image of a bowling score as soon as possible after the score is available, e.g., immediately after or at the time the score is recorded on a score sheet and preferably concurrently with the recording of the score on the score sheet. Preferably the image on the viewing screen should not be discontinued while printing a score on the score sheet. The prism type projector, for example, satisfies these desirable requirements.

In the prism projection system, a light source or beam is directed through one face of the prism and reflected internally from a second face and leaves the prism through a third face to be directed through projection means to a projecting screen. The second face provides the image receiving surface upon which score indicia are placed or marked for projection to the viewing screen. Usually in such a projection system, the prism and light source are contained in a lower housing and the reflected image is transmitted to an upper housing from which it is projected to the viewing screen, the upper housing being secured to the lower housing by a generally vertical frame member. It has been found that the floor vibrations and the like, normally present in a bowling alley, may be picked up and transmitted via the upper housing supports to the upper housing; the vibration resulting from unintentional contact with the apparatus may also be transmitted. The upper housing, at the end of the vertical support member, must either be held against vibration by use of more massive support members or the length of the support must be shortened to decrease the vibration to an acceptable limit. This is so even when the lower housing is bolted or otherwise secured to the floor.

Further, such device does not lend itself well to preadjustment of the optical system. The top and bottom housings would normally be assembled at the installation site and it is difficult to obtain direction of the light from the image surface in the lower housing to the correct position, e.g., on an image lens, in the upper housing.

In addition to the above disadvantages, where the supports between the housing are shortened, bowlers walking in front of the projection system, i.e., between the upper housing and viewing screen, may block the projection beam and interrupt the projected image. Where these supports are lengthened, in addition to the vibration problem, they create additional obstacles between spectators and the viewing screen, thereby blocking the view of at least some of the spectators with respect to at least a portion of the screen. Additionally, the system described requires the maintenance of two housings or casings, the optical components of which, such as projection lens and prism, need be kept reasonably clean for optimum projection.

It is an object of this invention to provide a new and useful projection system.

A more particular object of this invention is to provide a new and useful projection apparatus adapted to overcome any of the problems associated with projectors as discussed above, and particularly usable in the projection of bowling scores.

Still another object of this invention is to provide a score projector which includes a light transmitting platen having a light reflecting platen surface for backing a score sheet held adjacent the platen surface so that the surface of the score sheet remote from the platen surface is accessible for impressing a score sheet legend thereon, a light source, and an associated optical system in an advantageous arrangement greatly minimizing or eliminating the effects of vibration on the system as well as omitting structures which block viewing on a projection screen while giving unobstructed direction of the image to the projection screen.

A further object of this invention is to provide projection apparatus in accordance with any of the foregoing objects utilizing a prism surface as the image source.

Other objects of this invention will be apparent to those in the art from the following descriptions and the drawings, in which:

FIG. 1 is a perspective view of a form of projecting device shown in association with a viewing screen at the bowler's end of a pair of adjacent bowling lanes in a bowling establishment;

FIG. 2 is a view of the projector of FIG. 1 with the side casing wall and other portions removed;

FIG. 3 is a top view of the device of FIG. 1 as shown in FIG. 2; and

FIG. 4 is a view of a mirror mounting bracket shown in FIG. 2 and taken along line 4—4 of FIG. 2.

While an illustrative embodiment of the invention is shown in the drawings and will be described in detail herein, the invention is susceptible of embodiment in many different forms, and it should be understood that the present disclosures are to be considered as exemplifications of the principles of the invention and are not intended to limit the scope of the invention to the embodiment illustrated.

It is contemplated that the projection apparatus of the present invention can be utilized in connection with one or more bowling lanes, e.g., by placement at the bowler's end of a bowling lane, or plurality of bowling lanes, for projection of an image to a screen which may be supported from the bowling alley ceiling, and that such bowling lane, or bowling lanes, may be equipped with automatic pin setting and ball returning equipment of conventional design, such as are presently in use.

The present invention provides a score projection apparatus which employs a light transmitting platen, such as a prism having a light reflecting surface for backing a score sheet. A light source is provided and the light from the light source is directed through the prism and reflected from the platen surface carrying the image on the platen surface through and out from the prism and the image is directed and projected, e.g., to a viewing screen. Advantageously, the platen or prism, the light source and the projection lens and all optical elements intermediary the light source, prism, and projection lens are contained within a single housing with the projected image being projected from the housing to a position overhead of the housing, from which position it may be redirected to a viewing screen, e.g., by a suitable mirror mounted on a bowling alley ceiling structure. In one aspect, the invention contemplates the use of a pair of mirrors mounted at right angles with respect to each other in the light path between the prism and projection lens for reversing the image prior to projection through the lens. In a preferred form, the optical elements are adjustably mounted within the housing so that the complete optical system up to and including the projection lens may be conveniently preadjusted for direction of the projected image to any overhead position, e.g., at which a redirecting mirror may be mounted.

Turning now more particularly to the drawings, FIG. 1 illustrates the disposition of a projection apparatus 10 contained within a single housing 11 at the bowler's end of a pair of adjacent bowling lanes 12 and 13, separated by a ball return rack 14. The projection apparatus functions to project an image from platen surface 15 by internal reflection and optical direction through a port 16 in housing 11 to an adjustably mounted overhead mirror 17 and thence to a viewing screen 18. Mirror 17 is supported from the bowling establishment ceiling. Screen 18 is mounted from the bowling establishment's ceiling by suitable means, not shown. In the illustrated form, mirror 17 is disposed approximately six feet above port 16 which is in turn about waist high from the floor of the bowling establishment. Thus, the path of the image leaving port 16, as indicated by dotted line 21, is generally vertical to a position well above any height at which obstruction would normally occur during transmission to the screen. From the elevated position, mirror 17 reflects the image to screen 18.

In installation of the device, it is only necessary to adjust mirror 17 to receive the image from port 16 and reflect the same to screen 18, a very simple adjustment procedure. For such adjustment, mirror 17 is connected to support bracket or arm 22 through a ball and socket joint of generally tight fit as indicated at reference numeral 23, such as is commonly used for mounting of adjustable rear view mirrors in automobiles.

A frame-like cover 24 having a central opening is hingedly connected by hinge 25 to the top wall of housing 11. Cover 24 frames at least a central portion of surface 15 and may be pivoted upwardly on hinge 25 for insertion of a single score sheet or plurality of score sheets, e.g., a plurality of score grids printed on a single sheet, on surface 15. Preferably, the score sheet is of larger dimension than the opening in frame 24 so that when frame 24 is pivoted back down to its position shown in FIG. 1, the score sheet is held by its peripheral edges between frame 24 and housing 11.

Turning now to FIGS. 2 and 3, a blower 28 is secured to the lower wall of housing 11 by suitable bracket means. Blower 28 is connected by suitable electric circuitry, e.g., in the usual manner in projection systems, and is used to cool the projector light source provided in the illustrated embodiment in the form of lamp 29 mounted on bracket 30. Lamp 29 is preferably a quartz-iodine projection lamp of a commercially available type, and the lamp socket is secured to bracket 30. Bracket 30 is mounted by means of slot 31 therein and a thumb screw 32 in a suitable frame 33 secured to the outlet of blower 28. Thus, the air forced from blower 28 is directed toward lamp 29 for preventing undue heating of lamp 29.

With thumb screw 32 screwed tight, bracket 30 is clamped by means of slot 31 between frame member 33 and thumb screw 32. It will be noted that the disposition of lamp 29 relative to prism 36 and elliptical mirror 37 may be adjusted by loosening thumb screw 32 and sliding or pivoting bracket 30 until lamp 29 is in the desired position and then retightening thumb screw 32.

Referring now to FIGS. 2 through 4, elliptical mirror 37 is mounted by means of bracket assembly 38 to a cross brace 39 secured to the main frame 40 within casing 11.

Bracket assembly 38 comprises an adjustable mounting for mirror 37 and includes a bracket for holding the mirror and also includes adjustable mountings for slidably adjusting the bracket and mirror in three dimensions. Provision is also made for adjustment of the incline of the mirror. Accordingly, mirror mounting 41 includes a flange 42 forming a channel with a backing member 43 which is secured to legs 44. Legs 44 are pivotally mounted at 45 to arms 46 which upstand from a plate 47. A third arm 48, upstanding from plate 47, carries an adjusting wing bolt 49 threaded therethrough as at 50. One end of a tension spring 51 is anchored to arm 48 and the other end is anchored to backing member 43 for maintaining backing member 43 in abutment with the end of wing bolt 49.

A pair of padded flange members 52 are provided on backing member 43 and the channel formed by flange 42 includes padding as indicated by reference numeral 53. Elliptical mirror 37 is carried with its lower edge within the channel and insulated from flange 42 and backing member 43 by means of padding 53 and the upper end of the mirror is backed against padding 52 under urging of tension spring 54 biased between the upper edge of mirror 37 and backing member 43. It will be apparent that the inclination of mirror 37 held in mounting 41 may be adjusted with respect to forward and rearward inclination simply by turning wing bolt 49 in the appropriate direction the appropriate distance forward and rearward pivoting of members 43 being at pivots 45.

Plate 47 is secured to plate 57 by means of a wing nut and bolt assembly 58. Loosening of the wing nut permits pivoting of plate 47 with respect to plate 57 and thus mirror 37 may be pivoted to proper angular disposition as desired and held in the proper positioning by retightening wing nut 58. Plate 57 is provided with a pair of lateral slots 59 through which wing bolts 60 are passed and threaded into angle frame 61 as at 62. Loosening of wing bolts 60 permits sliding of plate 57 laterally the limit of slots 59 to either side of center on angle member 61 so that mirror 37 may be adjusted laterally as desired.

For vertical adjustment, wing bolts 65, which are threaded into the other leg of angle member 61, as at 66, may be loosened and vertical slots 67 are provided in frontal frame 68 so that upon loosening wing bolts 65 the entire assembly carried by angle member 61, including mirror 37, may be adjusted to the desired vertical height.

Frontal frame 68 includes a pair of lateral extensions or flanges 71 disposed over angle frame members 72, each of which includes a longitudinal slot 73. Frame members 72 are secured to the main frame 40. Wing bolts 70 pass through a bore in flange 71 and slots 73 and are threaded into a nut member 74. Tightening of wing bolts 70 secures frontal frame 68 against sliding relative to angle frame 72 while loosening of bolts 70 from nuts 74 permits longitudinal sliding of bolts 70 the limit of slots 73 for adjustment of the proximity of mirror 37 to bulb 29 and prism 36.

Retightening wing bolts 60, 65 and/or 70 after adjustment as desired secures the mirror in adjusted position. The prism 36 is mounted by suitable frame members 76 to main frame 40 adjacent the upper surface of the housing. The optical system for directing the reflected image from prism 36 to a projection lens, indicated generally by reference numeral 77, includes a planar mirror 78 which reflects the image to a pair of mirrors 79 and 80 mounted at a right angle with respect to each other. Right angle mirrors 79 and 80 invert and reflect the image to lens 77 for projection from the housing through port 16.

Mirror 78 is backed by a metal plate 83 which is, in turn, hingedly connected at 84 to frame 76. The angular disposition of mirror 78 is adjustable by a wing bolt 85 threaded through a support member 86 which is in turn supported from the bottom of housing 11. It will be seen that rotating wing bolt 85 in either direction will cause backing plate 83 to be pivoted clockwise or counterclockwise about hinge 84 carrying mirror 70 therewith for adjustment of the incline of mirror 87. Backing member 83 rests against the end of bolt 85 under force of gravity although biasing means, e.g., a tension spring, can be provided to bias member 83 against bolt 85.

Mirrors 79 and 80 are each planar and are mounted at right angles to each by means of angle brace 89. Mirrors 79 and 80 are backed by metal sheets 90 and 91, respectively, and may be bolted thereto in conventional manner for backing mirrors. Angle 89 is secured to backing sheets 90 and 91, e.g., by welding. Angle brace 89 has secured thereto a threaded pin 92 which projects through a bore in a brace member 93 secured to suitable frame work as at 94. A wing nut 95 is treaded on pin 92, and when tightened, fastens angle brace 89 against rotation on pin 92 by securing angle brace 89 against brace member 93. Wing nut 95 may be loosened and mirror members 79 and 80 may be pivoted together on brace 89 for adjustment thereof to proper disposition for direction of the light path through lens 77; tightening wing nut 95 causes the mirrors to be secured in their adjusted disposition.

Lens 77 is mounted in a lens holder 98 which has a flange 99 secured to angle link 100 by a bolt and wing nut assembly 101. Angle link 100 is in turn secured to angle link 102 by means of bolt and wing nut assembly 104. It will be seen that lens 77 is adjustable toward and away from prism 36 along the light path therefrom and is also adjustable in its angular inclination across the light path. Upon loosening all three of bolt and wing nut assemblies 101, 103 and 104, holder 98 and lens 77 may be moved along the light path and upon reaching proper disposition, the bolt and wing nut assemblies may be retightened to secure the lens and lens holder in the adjusted position. For adjusting the inclination laterally, as viewed in FIG. 3, wing nut 103 may be loosened and links 100 and 102 may be pivoted with respect to each other until lens 77 is in proper lateral disposition. In like manner, lens 77 may be inclined upward or downward, as viewed in FIG. 3, by loosening bolt and wing nut assembly 101 and upon adjustment to proper inclination retightening the bolt and wing nut assembly.

It will be noted that the entire projection system in the illustrated form of the present invention up to the projection lens is included in a single housing. The adjustment of each element of the optical system has been explained, and using the adjustments, the entire system may be preadjusted for projecting an image vertically to a predetermined position. The image may then readily be redirected as desired, such as by suitable overhead mirror means, e.g., as illustrated by reference numeral 17, to a viewing screen.

The prism type projectors operate in accord with the theory that where a legend constituting relatively non-reflective material is adhered to, deposited on or held closely against a portion of the internally reflecting surface 15, the reflectivity of that portion of the surface is markedly decreased or even destroyed so that an image is carried by the reflected light from the surface as a void in, or lower intensity portion of, the reflected light. Thus, the more advantageous score sheets are backed with material of relatively low reflectivity which will be referred to herein as "nonreflective" materials. The score sheet advantageously includes a nonreflective backing composition capable of transferring pressure printing which may be by pencil or other pressure stylus, such as printing type, from the upper or accessible surface of the sheet to the platen surface 15 of the prism. The score legend thereby impressed on surface 15 is projected to the viewing screen as described above. The legend on the surface 15 of the prism is reflected away from the printable surface of the score sheet, rather than transmitted therethrough, and the upper surface of the score sheet remains relatively cool to the touch. The printing means, e.g., pencil or stylus, used in printing the scores on the score sheet is not seen in the projected image.

The score sheet may be composed of conventional paper for printing thereon, or other paper such as paper of the type including its own ink supply, e.g., in encapsulated form. For example, the score sheet may be NCR paper backed with carbon so that, when printed upon, the ink supply within the sheet causes formation of a legible image responsive to the pressure of a stylus, and the carbon backing provided on the score sheet transfers an image to the surface of the prism.

Although a score sheet has been described hereinabove as having a transferable backing in the form of carbon, preferably the backing of the score sheet is an adhesive material capable of releasably adhering to surface 15 responsive to pressure on the printing surface of the score sheet. An example of such material is the adhesive-like material used in readily available "magic slate" construction. The wax-like magic slate materials automatically erase any impressions from the prism surface upon their removal, i.e., with removal of the score sheet, as may other similar materials. Preferably, the score sheet used in conjunction with a particular prism includes grids printed thereon registering with grids printed, lacquered or etched on the prism thereunder. A manifold of score sheets, the last score sheet in the manifold being backed with pressure transmitting substance, may be used, if desired, and a plurality of records may thereby be made concurrently with each other and concurrently with the producing of the legend for projection to a viewing screen.

The prism is preferably corrected with respect to depth of field, for example as disclosed by J. L. Byrd and P. G. Andrus in copending application Serial No. 358,525, filed April 9, 1964, entitled "Projection System" and assigned to the assignee of this application.

While the platen surface of the prism is substantially totally reflecting if the light strikes it at a suitable angle, there may be circumstances under which some stray light passes outwardly or inwardly through the glass-air interface at the platen surface and for this reason it is preferable to utilize a score sheet of material which is substantially nonlight transmitting.

I claim:
1. A score projector, comprising: a housing, a light transmitting prism mounted in said housing having a light reflecting platen surface accessible from without said housing for backing a score sheet adapted to have a score legend impressed thereon, means mounted on said housing for holding a score sheet with a pressure adhering surface adjacent said platen surface and the surface of the sheet remote from said platen surface accessible for impression of a score legend thereon, thereby to adhere impressed areas of the pressure adhering surface to the platen surface, a light source and first optical means associated therewith mounted in said housing for directing light through said prism toward said platen surface and reflecting an image of said score legend therefrom, a port in said housing, a projection lens mounted in said housing for directing projected light through said port and generally vertically to a position overhead of said housing, and second optical means mounted in said housing for reversing the image reflected from said platen surface and directing the reversed image through said projection lens.

2. A score projector, comprising: a housing, a light transmitting platen mounted in said housing having an internally reflecting surface for backing a sheet of material adapted to have a score legend impressed thereon, means for holding the sheet adjacent said platen surface with the surface of the sheet remote from said platen surface accessible for impression of a score legend thereon, a light source, first adjustable means mounting said light source in said housing, optical means associated with said light source for directing light to said platen and said sheet for directing an image of said legend therefrom, second separate adjustable means mounting said optical means in said housing, port means in said housing, and projection means mounted in said housing for projection of the directed image through said port means.

3. The device of claim 2 wherein said optical means is an elliptical mirror and said second adjustable means comprises a bracket for holding said mirror, means for slidably adjusting said bracket in three dimensions, and means on said bracket for adjusting the incline of said mirror.

4. The device of claim 2 including a blower mounted in said housing and having a discharge opening and wherein said first adjustable means comprises a bracket carrying said light source and means slidably mounting said bracket to said blower at said opening and releasable means for retaining said bracket against sliding, said bracket being adapted to support said light source within the flow path from said discharge opening and said slidable mounting means permitting slidable repositioning of said bracket with respect to light direction toward said platen with said releasable means released.

5. A score projector, comprising: a housing, a light transmitting platen mounted in said housing having a light reflecting surface for backing a score sheet adapted to have a score legend impressed thereon, means for holding a score sheet with a pressure adhering surface adjacent said platen surface and the surface of the sheet remote from said platen surface accessible for impression of a score legend thereon, a light source mounted in said housing, first optical means mounted in said housing and associated with said light source for directing light through said platen toward said platen surface for reflecting an image of said score legend therefrom, a port in said housing, and second optical means including a projection lens mounted in said housing for projecting the reflected image through said port and in a generally vertical direction overhead of said housing for redirection to a viewing screen.

6. A score projector, comprising: a housing, a light transmitting prism mounted in said housing having a platen surface for backing a sheet of material adapted to have a score legend impressed thereon, means for releasably holding the sheet adjacent said platen surface with the surface of the sheet remote from said platen surface accessible for impression of a score legend image thereon, a light source, first mounting means mounting said light source in said housing, first optical means associated with said light source for directing light into said prism through a surface thereof other than said sheet backing surface and through said prism toward said sheet for reflection of said image from said platen surface and in a light path from said prism, second mounting means mounting said first optical means in said housing, port means in said housing, projection means, third mounting means mounting said projection means for projection through said port means, second optical means including a planar mirror and a right-angle mirror for directing light reflected from said prism through said projection means and means mounting said planar mirror and said right-angle mirror between said prism and projection means, each for pivotal adjustment about a separate axis generally transverse to the light path.

7. A score projector, comprising: a waist height housing, light transmitting means defining an image surface for receiving an image of score information at said housing, a light source mounted in said housing, port means in said housing, projection means, adjustable means mounting said projection means for projection through said port means, first optical means mounted in said housing and associated with said light source for directing light to said image surface whereby the light carries the image of score information therefrom, second optical means for directing light from said image surface through said projection means and second adjustable means mounting said second optical means within said housing, said projection means comprising a projection lens and said first-mentioned adjustable means comprising means for varying the inclination of said lens across the light path from the image surface and the proximity of said lens to said image surface along said light path and for securing the lens in any of a plurality of inclinations within the light path.

8. The device of claim 7 wherein said second optical means comprises a frame and a pair of planar mirrors secured to the frame at right angles with respect to each other and said second adjustable means comprises means pivotally securing said frame to said housing and releasable means for retaining said frame against pivoting.

9. A projection apparatus, comprising: a light transmitting platen having an internally reflecting surface for backing a sheet of material for receiving a legend printed thereon, a light source and optical means associated therewith for directing light into said platen through a surface thereof other than said sheet backing surface and through said platen toward said sheet, and optical means for transmitting an image of a legend on said sheet through and from said platen to a viewing screen comprising a projection lens and a pair of planar mirrors mounted at right angles with respect to each other between said platen and said lens for reversing the image from said platen prior to transmission through said lens.

10. Projection apparatus, comprising: a housing, a light transmititng platen mounted in said housing and having an internally reflecting platen surface for backing a pressure transferable score sheet, means for releasably holding the score sheet against said platen surface, a light source mounted in said housing, optical means, means mounting said optical means within said housing for directing light from said light source through said platen toward said platen surface and reflecting an image therefrom and including means for projecting the reflected image outward from said housing, and adjustable means mounting said optical means within said housing.

11. The projection apparatus of claim 10 wherein said projecting means is a projection lens and said adjustable means comprises means for adjusting the path of light reflected from said platen surface relative to said projection lens and means for adjusting the disposition of said projection lens relative to said path of light.

12. Projection apparatus, comprising: a waist height housing having mounted therein a platen having a generally longitudinally disposed platen surface accessible from outside said housing for backing a sheet of material having a printable surface for receiving a score legend, means for holding said sheet against said platen surface, a quartz-iodine projection lamp, an elliptical mirror for directing light from said lamp toward said platen surface and carrying an image of said score legend from the printable sheet backed thereby, adjustable planar mirror means for reflecting light carrying said image, a horizontally disposed lens mounted for transmitting the image through a port in said housing in a generally vertical upward direction, and a pair mirrors mounted at right angles with respect to each other for reversing the image from said planar mirror means and directing the reversed image through said image transmitting lens, second planar mirror means at an overhead position and of sufficient size to receive and reflect an image transmitted from said housing by said lens and redirect the image to an overhead viewing screen, and adjustable mounting means for mounting said second planar mirror means to ceiling structure overhead from said housing.

13. A projector for projecting printed legends from a sheet comprising: a light transmitting platen having an internally reflecting surface for reflecting light from said platen, means mounting said platen with said surface in a generally horizontal plane, means for holding a sheet at said platen surface, a light source and optical means associated therewith for directing light through said platen toward said platen surface and carrying an image of said sheet therefrom, means for transmitting the image, means mounting said lens means in a generally horizontal plane for directing the image upwardly, a pair of planar mirrors between said platen and lens, means mounting said mirrors to reverse the image reflected from said platen and direct the reversed image upwardly through said lens, a viewing screen, and means mounted above said lens means for receiving the image from said lens and directing the image to said viewing screen.

14. A score projector, comprising: a housing adapted to rest on the floor of a bowling establishment in the approach area adjacent the bowler's end of a bowling lane, said housing including a top wall about waist height, means for receiving an image to be projected, means securing said image receiving means at said top wall in said housing against movement relative to said housing, a light source in said housing, optical means for directing light from said source to said image receiving means and for directing an image therefrom and including port means in said top wall and projection means mounted in said port means for projecting the image upwardly to mirror means adapted to be supported at an overhead position by ceiling structure for directing the image to a viewing screen also adapted to be supported by ceiling structure, and means mounting said optical means for adjustment relative to said image receiving means for permitting preadjustment of said optical system relative to said image receiving means, minimizing vibration of said image receiving means relative to said optical means and providing said image receiving means and projection means accessible at an upward singular housing for cleaning purposes while enabling projection of the image during operation of the device in a direction circumventing the adjacent bowler approach area to eliminate blocking of the image by bowlers and to a viewing screen position readily viewable by spectators without bowlers blocking the view.

References Cited by the Examiner
UNITED STATES PATENTS

| | | | |
|---|---|---|---|
| 2,273,936 | 2/1942 | Ceroni | 88—24 |
| 2,330,799 | 10/1943 | Coker et al. | 88—24 |
| 2,529,664 | 11/1950 | Roysher | 88—24 |
| 2,863,356 | 12/1958 | Goldberg | 88—24 |
| 3,126,786 | 3/1964 | Appeldorn | 88—24 |
| 3,174,414 | 3/1965 | Myer | 88—24 |

NORTON ANSHER, *Primary Examiner.*

V. A. SMITH, *Assistant Examiner.*